US012629679B2

(12) United States Patent
Choi et al.

(10) Patent No.: US 12,629,679 B2
(45) Date of Patent: May 19, 2026

(54) SPIRAL INERTIAL MICROFLUIDIC DEVICES AND METHODS TO REMOVE CONTAMINANTS

(71) Applicant: Massachusetts Institute of Technology, Cambridge, MA (US)

(72) Inventors: Kyungyong Choi, Cambridge, MA (US); Jongyoon Han, Bedford, MA (US); Stacy L. Springs, Medford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 588 days.

(21) Appl. No.: 18/174,089

(22) Filed: Feb. 24, 2023

(65) Prior Publication Data

US 2023/0347345 A1 Nov. 2, 2023

Related U.S. Application Data

(60) Provisional application No. 63/336,048, filed on Apr. 28, 2022.

(51) Int. Cl.
*G01N 21/64* (2006.01)
*B01L 3/00* (2006.01)
(Continued)

(52) U.S. Cl.
CPC . *B01L 3/502753* (2013.01); *B01L 2200/0652* (2013.01); *B01L 2300/0864* (2013.01); *B01L 2300/0883* (2013.01)

(58) Field of Classification Search
CPC ....... B01L 3/502753; B01L 2200/0652; B01L 2300/0864; B01L 2300/0883;
(Continued)

(56) References Cited

U.S. PATENT DOCUMENTS

2012/0296075 A1* 11/2012 Reed ...................... C07H 21/00 536/25.41
2018/0128723 A1* 5/2018 Ryu .................. B01L 3/502753
(Continued)

FOREIGN PATENT DOCUMENTS

CN 113105990 7/2021
WO 2011109762 9/2011
(Continued)

OTHER PUBLICATIONS

Zhu, Z., et al., "A polymer-film inertial microfluidic sorter fabricated by jigsaw puzzle method for precise size-based cell separation", Analytica Chimica Acta, 1143: 306-314 (2021).
(Continued)

*Primary Examiner* — Jennifer Wecker
*Assistant Examiner* — Oyeleye Alexander Alabi
(74) *Attorney, Agent, or Firm* — PABST PATENT GROUP LLP

(57) ABSTRACT

A spiral inertial microfluidics device has been designed for use as a microfluidic sorting device. The device includes a spiral microchannel in which particles or cells of different sizes go through regions having different magnitudes of inertial and/or drag forces and equilibrate at different lateral positions in the microchannel so that those particles or cells of different sizes are separated. Using different focusing characteristics of larger versus smaller particles/cells in the spiral microchannel, adventitious agents (AAs) such as bacteria, virus, mycoplasma, etc. can be selectively removed from cells such as those producing therapeutic enzymes or monoclonal antibodies or those comprising the product itself.

8 Claims, 6 Drawing Sheets

(51) Int. Cl.

| | |
|---|---|
| ***B82Y 5/00*** | (2011.01) |
| ***B82Y 30/00*** | (2011.01) |
| ***B82Y 40/00*** | (2011.01) |
| ***C07F 5/02*** | (2006.01) |
| ***C09B 57/00*** | (2006.01) |
| ***C09K 11/06*** | (2006.01) |
| ***G01N 1/30*** | (2006.01) |
| ***G01N 15/10*** | (2024.01) |
| ***G01N 15/1429*** | (2024.01) |
| ***G01N 27/626*** | (2021.01) |
| ***G01N 31/22*** | (2006.01) |
| ***G01N 33/483*** | (2006.01) |
| ***G01N 33/543*** | (2006.01) |
| ***G01N 33/58*** | (2006.01) |
| ***G01N 33/68*** | (2006.01) |

(58) Field of Classification Search
CPC ....... B01L 2300/088; B01L 2400/0409; B01L 3/50273; B01D 43/00
See application file for complete search history.

(56) References Cited

U.S. PATENT DOCUMENTS

| | | | |
|---|---|---|---|
| 2018/0136210 | A1 | 5/2018 | Khoo |
| 2022/0113243 | A1 | 4/2022 | Chun |

FOREIGN PATENT DOCUMENTS

| | | |
|---|---|---|
| WO | 2013181615 | 12/2013 |
| WO | 2014046621 | 3/2014 |
| WO | 2014152643 | 9/2014 |
| WO | 2015156876 | 10/2015 |
| WO | 2016044537 | 3/2016 |
| WO | 2016044555 | 3/2016 |
| WO | 2016077055 | 5/2016 |

OTHER PUBLICATIONS

International Search Report for corresponding PCT application PCT/US2023/019764 dated Jul. 25, 2023.

* cited by examiner

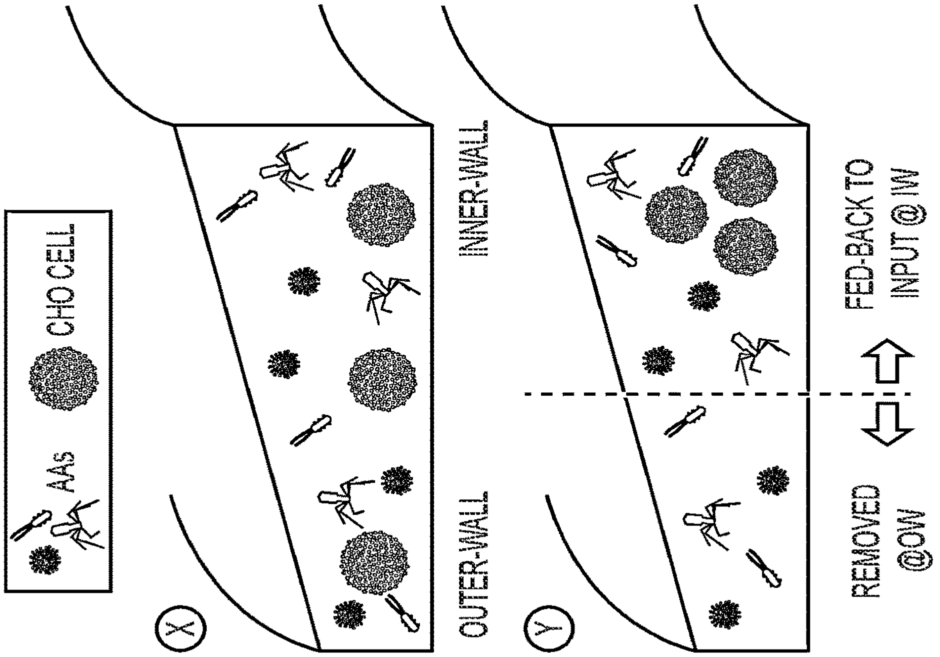
FIG. 2C
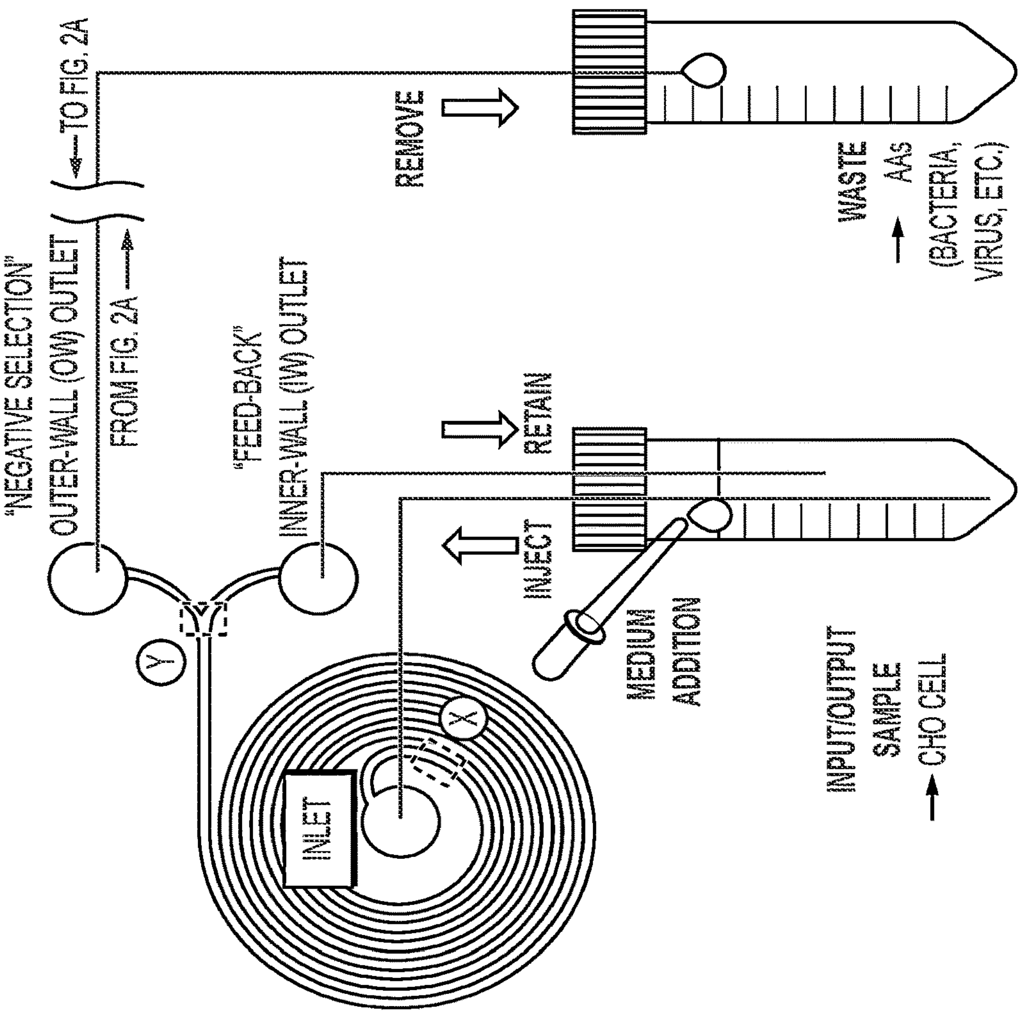
FIG. 2A
FIG. 2B

SPIRAL INERTIAL MICROFLUIDIC DEVICES AND METHODS TO REMOVE CONTAMINANTS

CROSS REFERENCE TO RELATED APPLICATIONS

This application claims priority to U.S. Provisional Patent Application No. 63/336,048 filed Apr. 28, 2022, the disclosure of which is incorporated herein by reference.

STATEMENT REGARDING FEDERALLY SPONSORED RESEARCH

This invention was made with Government support under Grant No. U01 FD006751 awarded by the Food and Drug Administration. The Government has certain rights in the invention.

FIELD OF THE INVENTION

The present invention is drawn to spiral inertial microfluidic devices and methods to remove contaminants such as bacteria, virus, fungi and mycoplasma, known as adventitious agents, that can be introduced during biomanufacturing processes.

BACKGROUND OF THE INVENTION

Centrifugation has been widely used for separation of particulate matter from fluid, for example, the separation of red and white cells from blood. Centrifugation has been enhanced or substitute with filtration materials such as molecular weight columns, filters having a range of pore sizes, and density gradient centrifugation. Although these techniques are relatively simple and straightforward, they are labor-, energy- and time-intensive and requires well-trained operators. Other conventional methods include fluorescence activated cell sorting (FACS) and magnetic activated cell sorting (MACS) to precisely control and separate target cells. While those methods offer an effective high-throughput and high-resolution separation, a time and effort consuming process is required for labelling cells, and the labelling process can lead to changes in the intrinsic cell properties and irreversible cell damage.

To overcome the limitations of conventional macroscale separation methods, a number of microfluidic separation techniques have been developed with many advantages of precise target control, minimized sample and reagent requirement, and capability of integration with different functional devices without the labelling process. Among those techniques, spiral microfluidic devices have been extensively utilized in sample preparation due to their advantages including high throughput (order of 1 mL/min per a single device), simple and robust operation without any need of additional force fields like magnetic, electric, and acoustic fields, and spatially compact device configuration compared to other inertial microfluidic devices.

In spiral microfluidic devices, lateral particle motion (in the cross-sectional view) is affected by inertial focusing by lift forces and circulating motion by additional hydrodynamic drag force caused by Dean flow. When a fluid flows through a curved channel, fluid elements near the channel centerline have a higher flow rate as compared to the fluid near the channel wall, and move outwards to the outer channel wall due to centrifugal effects and pressure gradient caused by the longer travel length along the outer wall compared to the inner wall, resulting in a secondary flow, the Dean flow. Depending on the size of the particle, the magnitude of the applied net lift force and the Dean drag force are changed, determining whether particles keep moving along the Dean flow or become focused on a certain equilibrium location in the channel's cross-sectional view.

The confinement ratio (CR=a/Dh, where a is the particle diameter and Dh is the hydraulic diameter of microchannel), is the key parameter with respect to the particle motion. Generally (for moderate flow rate condition with a constraint of the Dean number, De=f?$_c$(D$_h$/2r)$^{1/2}$<75, where d=I)$_h$/2r and r represent the curvature ratio and the average radius of curvature of the channel, respectively), in the case of a small CR (0.07), the net lift force applied to particles is negligible compared to Dean drag force, resulting in the circulating motion of particles without focusing (the non-focusing mode). In the case of large CR(>0.07), the lift force becomes stronger and comparable with Dean drag force, resulting in particle focusing on an equilibrium location determined by the competition between the net lift force and the Dean drag force (the focusing mode). In the intermediate CR (0.01<CR<0.07), particle motion is described as the rough focusing mode. As particle size increases, both the lift force and Dean drag force increase, but with a different power; in the case of the inertial lift force (1•',). 1•', $^c$a$^4$. and in case of the Dean drag force (1•'$_u$). F $_D$øa. Therefore, generally in the spiral device, as particle size increases, the equilibrium location gradually moves toward the inner wall due to the highly increased lift force, and, using this principle, particles can be separated depending on their sizes.

Spiral microfluidic devices have been widely utilized for the separation of particles, especially for large CR particles but there are some critical drawbacks which reduce their applicability. These drawbacks include narrow target size ranges (due to the difficulty in focusing particles with the small and intermediate CR conditions) and the relatively low-efficiency and somewhat unreliable separation (due to the small separation distance between focused bands of large CR particles which exist only around the inner wall side). For effective separation in such spiral devices, various approaches have been studied including, for example, use of a two-inlets spiral device with an additional sheath flow, a trapezoidal spiral device, and a double-spiral device.

With respect to the spiral device with an additional sheath flow. all particles (with the large and even intermediate CR conditions) are injected into the spiral channel, are focused on the outer wall side by the additional sheath flow, and start moving away from the focused flow stream to their equilibrium locations which results in their separation. The initial focusing effectively reduces the particle interaction while the particles travel to their equilibrium locations, which significantly increases separation resolution and efficiency. In addition, due to the initial focusing on the outer wall side, particles in the intermediate CR range can reach their equilibrium locations near the outer wall in a focused band, despite low applied lift force. As a result, in the spiral device with an additional sheath flow, particles can be separated with high separation performance and wide target size ranges (even particles in the intermediate CR range). In the case of separating two different sizes of particles, design channel dimensions can be designed or configured to have different CR regimes so that the large CR particles and the intermediate CR particles can be focused near the inner wall and the outer wall, respectively, resulting in their separation with large separation distance and high separation efficiency.

However, the use of two inlets makes the flow control complex and limits the operating flexibility such as closed-loop operation, which reduces the applicability of such devices. A spiral microfluidic device with a trapezoidal cross-section was described which generates stronger Dean vortices at the outer half of the channel, resulting in significantly increased separation distance between larger and smaller particles even in a one-inlet configuration. However, even in the trapezoidal spiral device, because of the low magnitude of lift force driving particle focusing, small particles with the intermediate CR may still not form a focused band, and this in turn limits the applicability of the trapezoidal spiral device. In the double spiral device, the sequential pinch effect acts to compact both sides of the focusing band resulting in a sharper and narrower band compared to single spiral device, which improves separation performance.

However, the double spiral device also has the difficulty in focusing and separating particles within the intermediate CR range, and the separation performance is less than that of the two-inlet spiral device with an additional sheath flow.

It is therefore an object of the present invention to provide a simple spiral device for use in separating particles or cells in a solution such as blood or cell culture media.

SUMMARY OF THE INVENTION

A spiral inertial microfluidics device has been designed for use as a microfluidic sorting device. The device includes a spiral microchannel in which particles or cells of different sizes go through regions having different magnitudes of inertial and/or drag forces and equilibrate at different lateral positions in the microchannel so that those particles or cells of different sizes are separated. The inertial net lift force on a particle ($F_L$) is proportional to the diameter of a particle ($a_p$) to the power of $$4(F_L \sim a_p^4),$$

The Dean drag force on a particle ($F_D$) is proportional to particle diameter ($F_D \sim a_p$). As indicated by proportionality to the power of particle diameter, larger particles or cells are dominantly affected by the inertial net lift force and focused at the inner side of the spiral microchannel when volumetric flow is applied. Smaller particles are dominated by the Dean drag force and drift through two counter-rotating vortices called Dean vortices formed in the spiral microchannel, not being focused at certain lateral position. Using different focusing characteristics of larger versus smaller particles/cells in the spiral microchannel, adventitious agents (AAs) such as bacteria, virus, mycoplasma, etc. can be selectively removed. This process allows select cells, such as cells needed to produce therapeutic enzymes or monoclonal antibodies, for example, Chinese Hamster Ovary (CHO) cells for therapeutic protein production, stem cells or T cells for cell therapies, to be retained.

BRIEF DESCRIPTION OF THE DRAWINGS

FIG. 2A is an expanded view of the process using the device shown in FIG. 1. First, cells suspended in culture medium, such as cells from a MCB or WCB, are loaded in a container and then injected into the inlet to the spiral microfluidic flowpath at a certain flow rate using a pump. As shown in the cross-sectional images in FIGS. 2B and 2C, the cells or particles in the sample are randomly dispersed at the beginning of the spiral microchannel. Larger cells like CHO cells (~15 μm) are transported to the inner wall (IW) side of the spiral microchannel after going through multiple loops of spiral channel due to the effect of the inertial net lift force (FIG. 2B). Adventitial agents, usually very small in size (<1 μm) (e.g. bacteria, virus, mycoplasma, etc.) are dominated by the Dean drag force and may still be randomly dispersed after multiple loops of the spiral microchannel (FIG. 2C).

As shown in FIGS. 2A-2C, most of CHO cells are focused at the IW side of the spiral microchannel when the volumetric flow rate is higher or equal to 2 mL/min. As can be seen from the histogram of gray value in the standard deviation of the stacked images (FIG. 3C), CHO cells are focused at the IW side and shows similar distribution of focused cell streamlines for flow rates higher or equal to 2 mL/min.

DETAILED DESCRIPTION OF THE INVENTION

Figure 1:
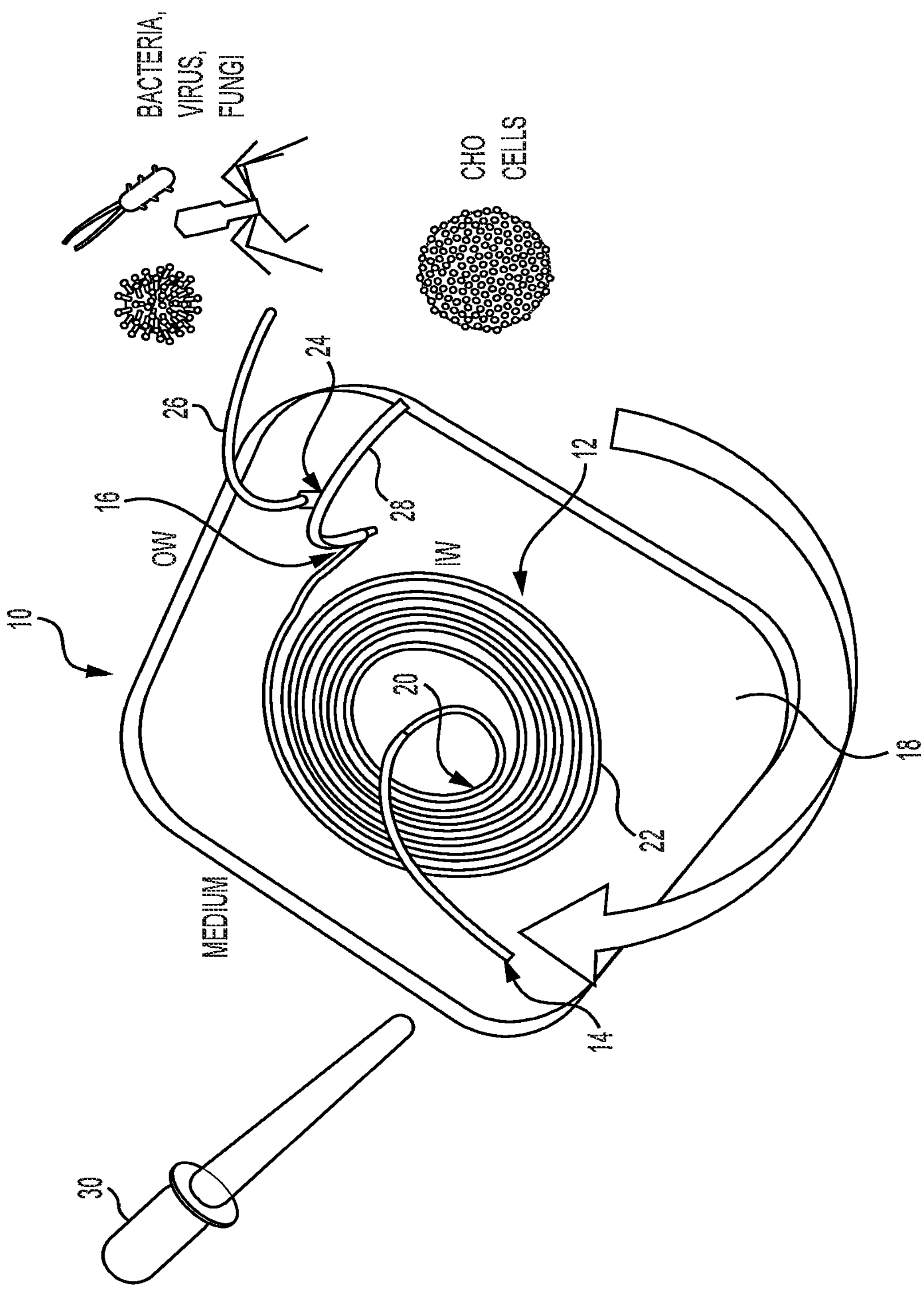
FIG. 1 shows the spiral device for use in the purification of products obtained, for example from a master cell bank (MCB) or working cell bank (WCB) of a production cell line (e.g. CHO cell). The cells suspended in culture media are applied to the end of the spiral microfluidic device flowpath in the center. As the device is spun, fluid moves through the spiral flow path, separating smaller particles such as bacteria, virus and fungi to the outer side of the flowpath and the cultured cells to the inner side of the flowpath.

The separation of microparticles and filtration based on size are essential for many applications in diverse fields. Different methods for the separation of cells or particles have been developed, removing the microparticles from solutions such as membrane filter. However, micropillars or pore filtrations have a high probability of particle clogging because of the exact pore size of the filter. As cells become lodged in the microscale constrictions during the separating process, the overall hydrodynamic resistance of the filter changes and diminishes the effect of the applied pressure gradient. Because of this clogging problem, several membraneless separation techniques have been introduced, for example sedimentation, field-flow fractionation, hydrodynamic chromatography, pinched-flow fractionation, electrophoresis, dielectrophoresis, acoustic separation, diffusion-based extraction, deterministic lateral displacement, centrifugation, and inertial focusing. Even though these membraneless techniques make clogging less likely to occur, some disadvantages remain. For example, electrophoresis and dielectrophoresis provide a high resolution of particle separation, however they both require an external power source and generate heat that might harm the cells over a long operating period.

Spiral microfluidic devices for simple, rapid separation of cells such as cultured somatic tissue cells, from smaller agents such as viral, fungal or bacterial agents, have been developed to address the deficiencies in the previous separation techniques and associated technology. The use of curved microchannels avoids the disadvantages of previous microfluidic chip designs that require external applied forces or complicated system integration.

I. Definitions

Microfluidics relates to the design and study of devices that move or analyze the tiny amount of liquid, smaller than a droplet.

Microfluidics refers to the behavior, precise control, and manipulation of fluids that are geometrically constrained to a small scale at which surface forces dominate volumetric forces. It is a multidisciplinary field that involves engineering, physics, chemistry, biochemistry, nanotechnology, and biotechnology.

A microfluidic chip is a device that enables a tiny amount of liquid to be processed or visualized. The chip is usually transparent, and its length or width are from 1 cm to 10 cm. The chip thickness ranges from about 0.5 mm to 5 mm. Microfluidic devices have microchannels ranging from submicron to few millimeters that are connected to the outside by inlet/outlet ports. Microfluidic chips are made from thermoplastics such as acrylic, glass, silicon, or a transparent silicone rubber called polydimethyl silicone (PDMS).

Microfluidics systems work by using a pump and a chip. Different types of pumps precisely move liquid inside the chip with a rate of 1 μL/minute to 10,000 μL/minute. For comparison, a small water drop is approximately 10 microliter (μL). Inside the chip, there is one or more microfluidic channels that allow the processing of the liquid such as mixing, chemical or physical reactions. The liquid may carry tiny particles such as cells or nanoparticles. The microfluidic device enables the processing of these particles, for example, trapping and collection of cancer cells from normal cells in the blood.

Spiral Microfluidic devices are generally a single spiraling channel that branches at the outside end of the channels. Flow normally enters from the center of the spiral and exits from the outside. Spiral channels are generally used for the separation and sorting of particles caused by inertia.

II. Spiral Microfluidic Devices and Methods of Making

FIG. 1 shows the spiral devices which have been developed. These are characterized by a single spiral from the inlet at the center of the device to the outside.

Spiral microchannels, devices comprising such channels, and methods for the use of thereof have been described, for example, in Lim et al, W02011/109762A1; 9 Sep. 2011; Birch et al, WO 2013/181615; 5 Dec. 2013, Han et al., WO 2014/046621 A1; 27 Mar. 2014, Hou et al, WO 2014/152643 A1; 25 Sep. 2014; Voldman et al, WO 2015/156876 A2; 15 Oct. 2015; Warkiani et al, WO 2016/044537 A1; 24 Mar. 2016; Warkiani et al, WO 2016/044555 A1; 24 Mar. 2016; Sarkar et al., WO 2016/077055 A1; 19 May 2016; Ryu et al, US20180128723 A1, 10 May 2018; and Khoo et al, US20180136210 A1; 17 May 2018.

In microfluidic devices, particles flowing in curvilinear (such as spiral) channels are influenced by both inertial migration and secondary Dean flows. The combination of Dean flow and inertial lift results in focusing and positioning of particles at distinct positions for concentration and separation applications.

Spiral microfluidic devices have been widely utilized for sample preparation mainly as a concentrator or a separator. In such spiral devices, the particle focusing position is predominantly determined by the ratio of particle size and channel dimension: the smaller the channel dimensions, the smaller the particles that can be focused on the inner wall side.

As shown in FIG. 1, the spiral microfluidic device 10 includes:

- a first spiral microchannel 12 having an inlet 14 and an outlet 16, the microchannel 12 positioned on substrate 18 having an inner wall 20 and an outer wall 22;
- wherein the inner wall 20 of the spiral microchannel 12 has a larger cross-sectional area than the outer wall 22 of the spiral microchannel 12,
- wherein the cross-sectional area of the spiral microchannel 12 remains constant along its length, and
- wherein the device is configured to separate particles from a sample fluid including a mixture of particles, with the larger particles moving towards the inner wall 20 and to outlet microchannel 26, with the smaller particles moving along the outer wall 22 towards outlet microchannel 28.

The sample fluid is placed in an inlet/input reservoir and the inlet 14 is in fluid communication with the inlet/input reservoir (not shown) or applied using a syringe (not shown) or dropper 30 and the sample fluid is infused into the spiral microchannel inlet 14. In the preferred embodiment, fluid is moved using a pump such as a peristatic pump through which the sample can be easily circulated.

Size, volume and (flow) rate can be scaled as needed. A typical volume of a sample that can be processed is in the range of a few milliliters to a few tens of milliliters, but can be scaled to process up to tens of liters.

Devices are preferably made out of polydimethyl siloxane (PDMS) or other biocompatible plastic such as polycarbonate, polypropylene, polystyrene, etc.

Tubing and connectors for microfluidic connection can be commercially purchased.

Bifurcated outlets are implemented by bifurcating the microchannel into two with a selected ratio at the end of spiral microchannel.

Cross-sectional dimensions, typically in range of: inner-wall height: 150-250 μum; outer-wall height: 50-150 μm; channel width: 500-2000 μm) are maintained throughout the channel until the channel reaches the outlet bifurcation. The shape can be rectangular, trapezoidal or any shape that can be realized by fabrication method.

The length/number of spirals of microfluidic channel is determined by the length of the channel needed for cell focusing, and typically ranges from a few centimeters to a few tens of centimeters.

Devices can be made by soft lithography or injection molding.

The devices can be connected to other devices, if the fluidic resistance and flow rates are well matched.

The devices can be used singly or serially, to enhance separation.

The output from outlet 28 may be collected into to a reservoir 30, which may be the original source of sample entering the spiral device for purification or a separate reservoir (not shown) for purified product. In one embodiment, the purified product is recirculated through the device 10 to be further purified. Typically, the output from outlet 26 will be emptied into a reservoir 32 for discard.

III. Methods of Use

FIG. 2A shows the overall process and how this process can be applied and verified. Production of certain biologics products starts with either master cell bank (MCB) or working cell bank (WCB) of a production cell line (e.g. CHO cell). Although these cell banks are usually rigorously tested for identity, sterility, infectivity, etc. and handled with extreme care, there is still a chance that contaminants like AAs can invade during certain processes such as manual handling between centrifuge and washing step, or transfer of the cells from one container to another or from raw materials that are contaminated. Therefore, a spiral microfluidic sorter device that can remove AAs while retaining cells during its continuous operation in a closed feed-back loop is used.

Any cell type could be purified, for example, CHO, VERO, T cells, NK cells, MSCs etc. The device can also be used as part of the experimental workflow to detect adventitious agents over background cell reads in sequencing experiments, for example, by sorting cells away from virus or bacteria, then sequence viral or bacterial nucleic acids.

The device can be used in place of a filter. Size differentials of a few micrometers is helpful. The agents that are hydrodynamically focused should be larger than a certain size (such as channel height*0.07), but there is no minimum size of agents that are cleared by this method. The method is more likely restricted by having too much solid fraction of the sample. If the solid fraction of the sample is too high, the hydrodynamic cell focusing behavior is compromised.

The operation of the device can be completely automated, and all tubing and connections can be configured in a completely closed manner that it can prevent entry of external contaminants into the system. The in-process test is performed to confirm the state of clearance by using several in vitro biosafety tests such as microscopy, quantitative polymerase chain reaction (qPCR), and/or next-generation sequencing (NGS). Confirmation of AA clearance through in vitro in-process tests is of importance as it can prevent the spread of further downstream contamination.

The working principle of adventitious agent clearance via spiral microfluidic sorter is shown in FIG. 2A. First, input sample, such as cells from a MCB or WCB, are loaded in a container and then injected into the spiral microfluidics, preferably at a certain flow rate controlled with a pump. As shown in the cross-sectional image in FIG. 2B, all the cells or particles in the sample are randomly dispersed at the beginning of the spiral microchannel. Larger cells like CHO cells (~15 μm) are transported to the inner-wall (IW) side of the spiral microchannel after going through multiple loops of spiral channel due to the effect of the inertial net lift force. AAs that are usually very small in size (<1 μm) (e.g. bacteria, virus, mycoplasma, etc.) are dominated by the Dean drag force and still be randomly dispersed after multiple loops of the spiral microchannel (FIG. 2C cross-sectional image). The spiral microfluidics is configured in a way that the IW outlet is fed back to the input sample so that CHO cells that are inertially focused at the IW side of the spiral channel are retained in the feed-back loop while arbitrarily dispersed AAs are constantly removed towards the OW outlet. With careful adjustment of the bifurcation ratio at the end of the spiral microchannel, one can maximize the retention of CHO cells at each cycle. Clean, chemically defined medium is constantly added to the input reservoir 30 to replace the medium that is lost to the OW waste stream into reservoir 32. The medium is constantly added for two reasons: 1) to maintain cell population density (cell concentration) in the sample so that severe particle to particle interaction does not occur; 2) to continue the operation until ones achieves the desired level of AA clearance. If this circulatory feed-back operation is continued for enough number of cycles, most of AAs in the initial sample are removed while most of CHO cells are retained in the IW feed-back cycle.

There are a number of advantages of the methods using the spiral microfluidic devices as compared to other existing methods, devices or materials. Compared to membrane filtration-based devices such as nanofiltration which require frequent replacement of filter membrane or the whole device due to clogging, spiral microfluidic devices operate without clogging because particles follow continuous fluidic motion instead of being stuck at pores. Although some recent technologies like alternating tangential flow (ATF) filtration allows continuous cell culture production and minimizes the chance of membrane clogging by reversibly flowing clean media across the membrane periodically, they cannot be made completely free from clogging or unwanted accumulation of virus in the bioreactor. Acoustic wave separator (AWS), which is another commercially available technology for continuous cell culture production, can be used to achieve clarification of harvested cell culture fluid by removing CHO cells with acoustophoresis-assisted aggregation of CHO cells. It may be continuously operated with medium addition to clear out adventitious agents in the original sample, but it will result in aggregation of CHO cells by its nature of operation and does not allow recovery of non-aggregated CHO cells after operation. On the other hand, spiral microfluidic sorter devices do not induce any aggregation of buoyant cells in media, thus enables recovery of planktonic, viable cells in the end. Moreover, spiral microfluidic sorter devices can be operated in a closed, automated manner so that it can be free from human error as well as contaminants entering into the cell sample due to manual handling. Spiral microfluidics operation with the proposed scheme is still quite different from existing spiral microchannel-based cell sorting in that its operation can be continued until it removes contaminants down to satisfactory level while retaining cells of interest.

Another advantage of the devices and processes of use thereof, is that they can be done in a continuous, closed manner so that they can replace manual handling and washing steps, which has the potential to bring contaminants into the cell line. Spiral microfluidics does not usually suffer from clogging unless severe aggregation of cells happens, so the device can be re-used many times if proper device washing steps are followed. Throughput of the spiral microfluidics can be significantly enhanced by device multiplexing.

The devices and use thereof are particularly advantageous to replace cumbersome centrifuge and washing steps and minimize the chance of contamination from manual handling.

IV. Cells that can be Purified

As noted above, almost any type of cell can be purified using these devices. In a preferred embodiment, the spiral microfluidic devices are used to remove contaminants from somatic cell lines or any therapeutic cell lines such as CHO, VERO, T cells, NK cells, MSCs etc.

In another embodiment, the devices can be used to purify cells such as genetically engineered cells and CAR-T cells that may have unincorporated genetic material in the engineered cells.

Conversely, the device can be used to harvest small particles like virus from the cell line. For example, LRV of 3 for virus particles in the input sample means 99.9% recovery of these virus particles in the other output (noted as "waste" sample in FIG. 2). The device can be used for continuous harvesting of virus particles or viral vaccines if it is applied to cell lines of other biomanufacturing such human embryonic kidney (HEK) 293 cells or Vero cells.

The present invention will be further understood by reference to the following non-limiting examples.

Example 1: Effect of Flow Rate on Separation of CHO Cells

Materials and Methods

The effect of the flow rate on separation of CHO cells from smaller particles was examined, using flow rates of 1, 2, 3 and 4 ml/min.

Results

Figure 3A:
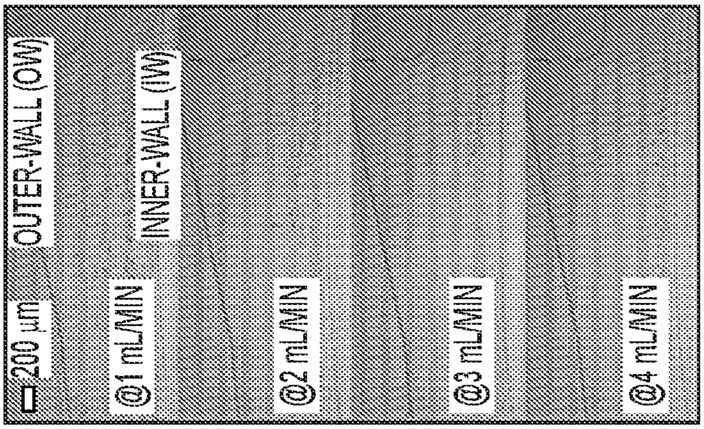
FIG. 3A is bright-field microscopic images of cell-focusing behavior of spiral microfluidics at different flow rates.
Figure 3B:
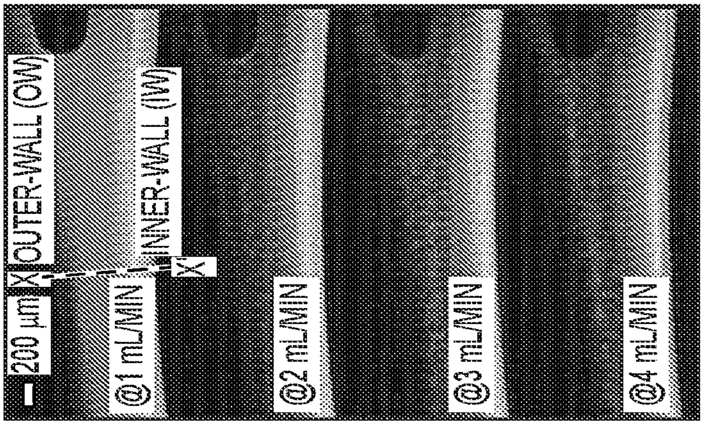
FIG. 3B show the standard deviation of stacked images to observe particle traces (1,000 images taken at 1,000 pictures per second rate).
Figure 3C:
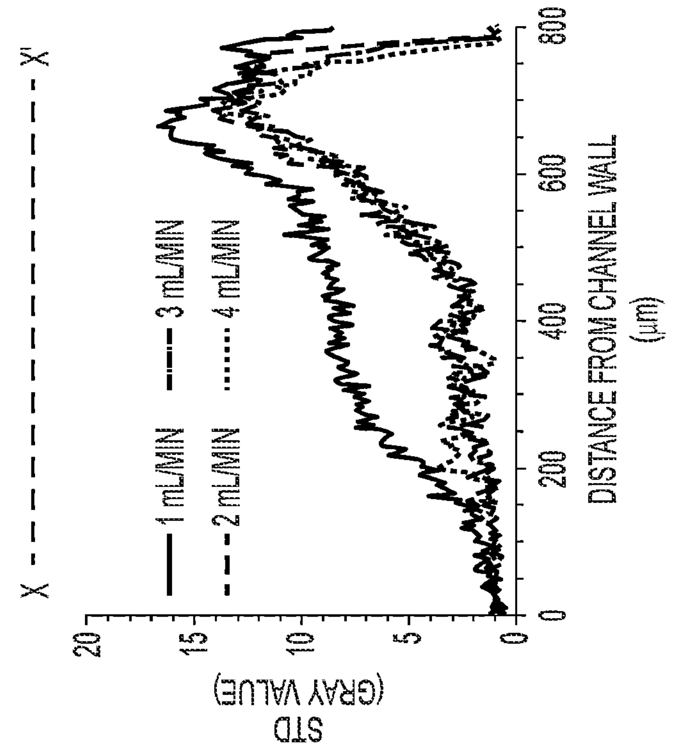
FIG. 3C is a Histogram of gray value at the cross-section (X-X' in FIG. 3B).

Microscopic snapshots of CHO cell focusing behavior at the beginning and at the end of the spiral microchannel (at the bifurcation) are shown in FIGS. 3A and 3B. FIG. 3C is a histogram of the distance from the channel wall (microns). As described with reference to the process shown in FIG. 2A, most of CHO cells are focused at the IW side of the spiral microchannel when the volumetric flow rate is higher than or equal to 2 mL/min. FIG. 3B shows the standard deviation of a thousand-image stack taken continuously at 1,000 pictures per second rate. (Bright pixel in the image means that the pixel has high deviation from the average intensity due to passing of many particles/cells through that pixel.) As can be seen from the histogram of gray value in the standard deviation of the stacked images (FIG. 3C), CHO cells are focused well at the IW side and show similar distribution of focused cell streamlines for flow rates higher or equal to 2 mL/min.

Example 2: Effect of Washing Volume on Recovery of Separated CHO Cells

Materials and Methods

Theoretical clearance of adventitious agents and CHO cell recovery that can be achieved by spiral microfluidic operation with "constant medium addition" (medium added in mL) was determined based on overall CHO cell recovery (percentage) and log reduction value ("LRV") of AAVs. The amount is typically in the range of the quantifiable limit of detection by the instrument (e.g., microscope, colony forming unit counting, or qPCR), rather than the sorting device.

10 mL of CHO cell sample with certain number of adventitious agents was injected into the spiral microfluidics. The volume of medium was maintained at a constant level by constantly adding medium to the fresh medium.

Results

Figure 4:
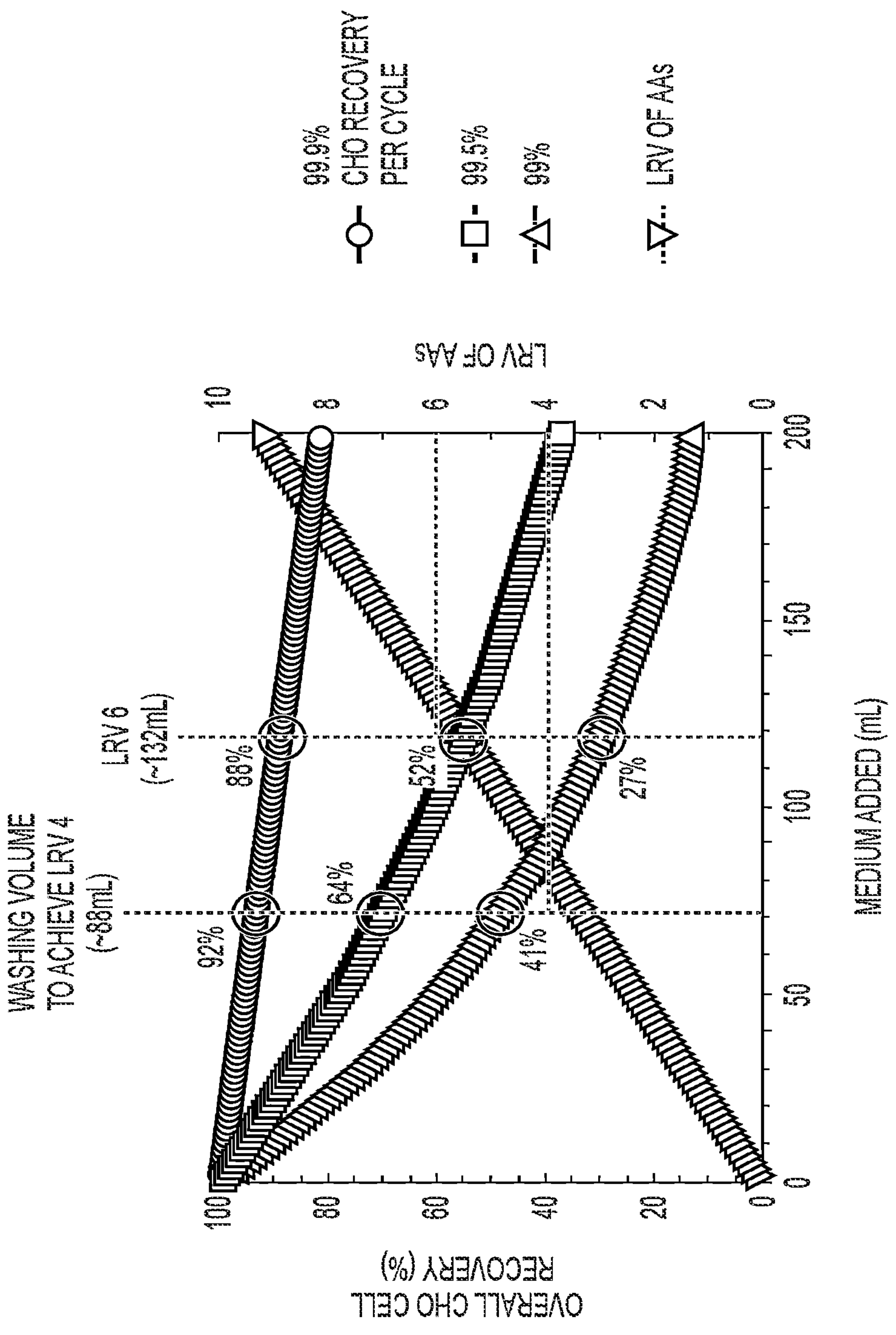
FIG. 4 is a graph of the Overall CHO cell recovery (%) and log reduction value (LRV) of adventitious agent versus medium volume (ml) added to wash CHO cells via spiral microfluidics operation with "constant medium addition".

The results are shown in FIG. 4. Log reduction value (LRV), which is used as an indicator to quantify the clearance of adventitious agents, is defined as follows $$(LRV) = \log_{10}\frac{\text{(concentration of adventitious agent before treatment)}}{\text{(concentration of adventitious agent after treatment)}}.$$

For example, when the concentration of virus in the sample is reduced by 10-fold or 90% after a certain treatment, the treatment achieves 1 LRV.

Assuming that adventitious agents in a CHO cell sample are small enough to be mainly affected by the Dean drag force and distributed equally across the spiral microchannel during the spiral microfluidics operation, the calculation predicted that an LRV of 4 can be achieved when approximately 88 mL of fresh medium is added and an LRV of 6 can be achieved when approximately 132 mL of fresh medium is added.

FIG. 4 shows overall CHO cell recovery (left y-axis) and log reduction value (LRV) of adventitious agents (right y-axis) versus medium volume added to wash CHO cell via spiral microfluidics operation with "constant medium addition" scheme.

With 99.9, 99.5 and 99.0% of CHO cell recovery at each circulation of spiral operation assumed, the final CHO cell recovery at LRV of 4 is estimated to be 92, 64 and 41%, respectively. If the operation is continued until LRV of 6 is achieved, the final CHO cell recovery is estimated to be 88, 52 and 27%, respectively.

Example 3: Separation of CHO Cells from PS Beads

Materials and Methods

As a further proof of concept experiment, 1 μm polystyrene fluorescent beads ("PS") were added to CHO cells in culture medium (CHO cell sample of 5 mL with cell concentration of approximately $2.0\times10^6$ cells/mL) to a concentration of approximately $4.0\times10^7$ particles/mL (FLUORESBRITE® YG Microspheres 1.00 μm, Polysciences, Inc.) to simulate presence of adventitious agents in the CHO cell sample and the mixed sample processed with the spiral microfluidics with constant medium addition scheme. 50 mL of medium was added to wash the initial sample.

Results

Figure 5A:
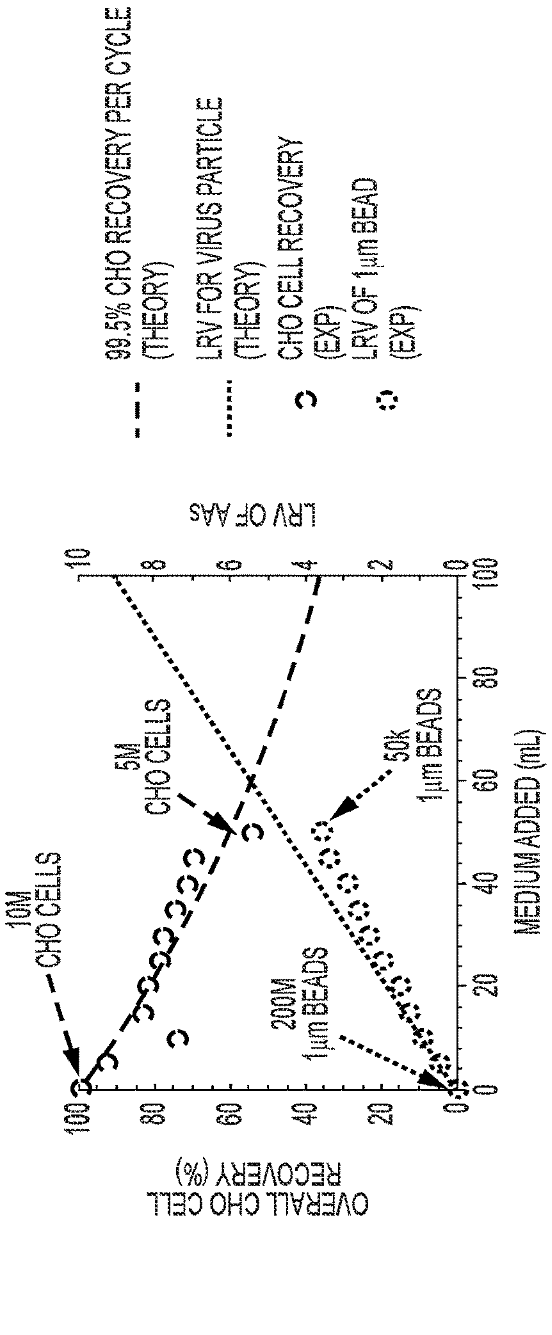
FIG. 5A is a graph CHO cell recovery (left y-axis) and log reduction value (LRV) of 1 μm polystyrene beads (right y-axis) versus medium volume (mL) added during spiral microfluidics operation with constant medium addition.
Figure 5B:
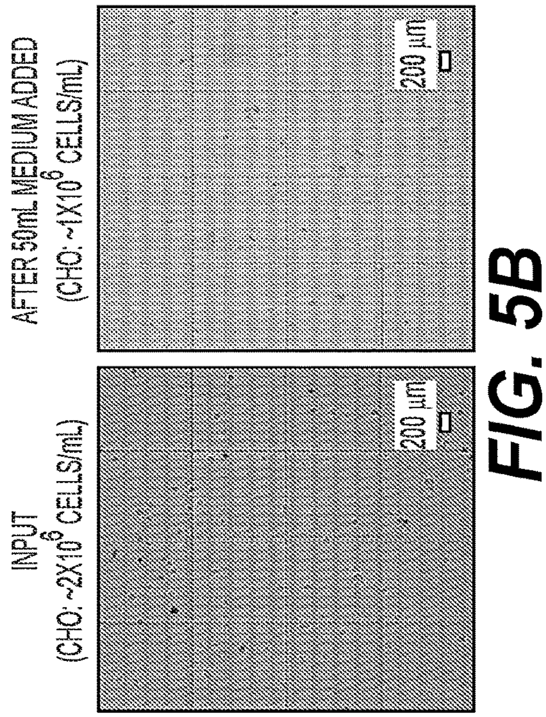
FIG. 5B are bright-field microscopic images of the initial input and the final sample (washed with 50 mL of medium for comparison of CHO cell concentration).
Figure 5C:
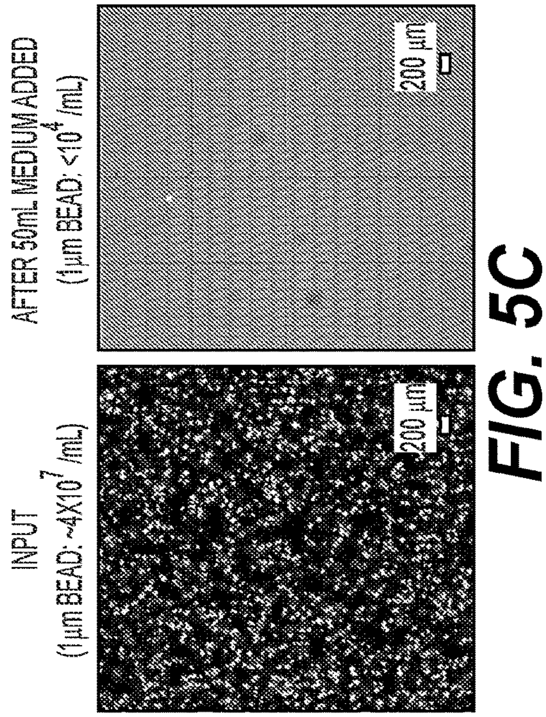
FIG. 5C are fluorescent microscopic images of the initial input and the final sample for comparison of 1 μm beads concentration.

As shown in FIG. 5A, approximately 55% of CHO cells were recovered while the concentration of 1 μm beads was reduced by 3.6 LRV (approximately 4,000-fold) after 50 mL of medium was added to wash the initial sample. It was confirmed that there were approximately $1.1\times10^6$ cells/mL CHO cells remaining in the final sample (initial input: approximately $2.0\times10^6$ cells/mL) after 50 mL of medium washing (FIG. 5B). It was also observed that there were less than approximately $10^4$ particles/mL 1 μm beads left in the final sample (initial input: approximately $4.0\times10^7$ particles/mL) (FIG. 5C). This proves that spiral microfluidics operation with constant medium addition removes small particles in the CHO cell sample effectively while retaining most amount of CHO cells.

Example 4: Separation of Bacteria from CHO Cells

Materials and Methods

To demonstrate more realistic adventitious agent clearance, bacteria (*Escherichia coli* K-12 with green fluorescent protein) were added to CHO cells to a concentration of approximately 2.8×$10^8$ CFU/mL into CHO cell sample of 10 mL with cell concentration of approximately 1.3×$10^6$ cells/mL, as described in Example 3.

Results

Figure 6A:
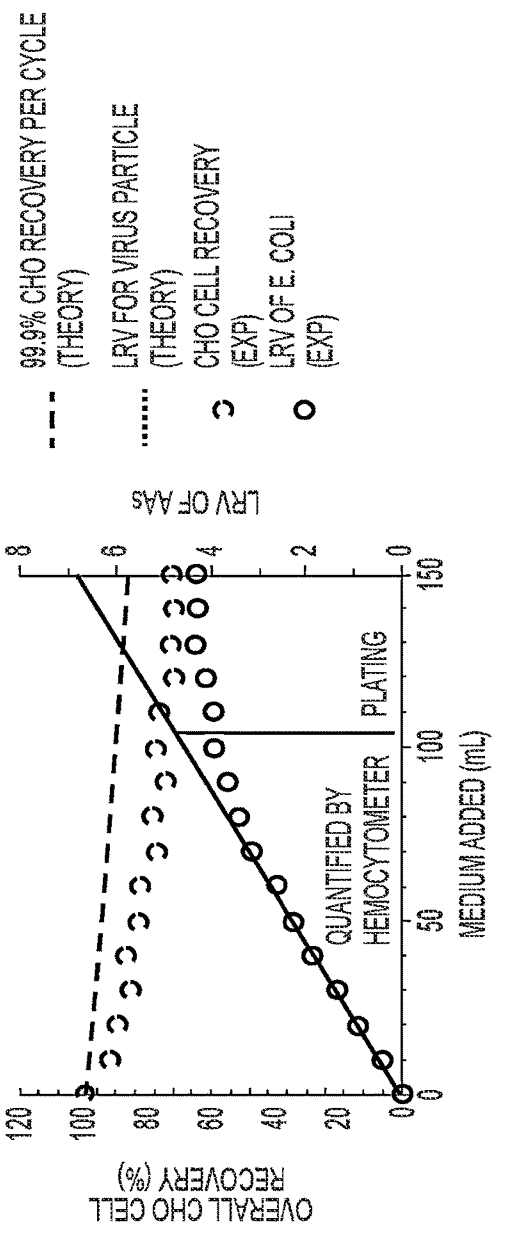
FIG. 6A is a graph CHO cell recovery (left y-axis) and log reduction value (LRV) of 1 μm polystyrene beads (right y-axis) versus medium volume (mL) added during spiral microfluidics operation with constant medium addition.
Figure 6B:
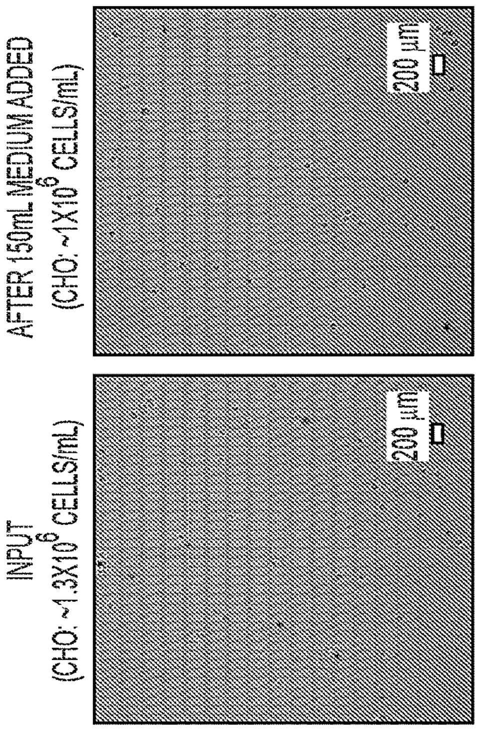
FIG. 6B are bright-field microscopic images of the initial input and the final sample (washed with 150 mL of medium for comparison of CHO cell concentration).
Figure 6C:
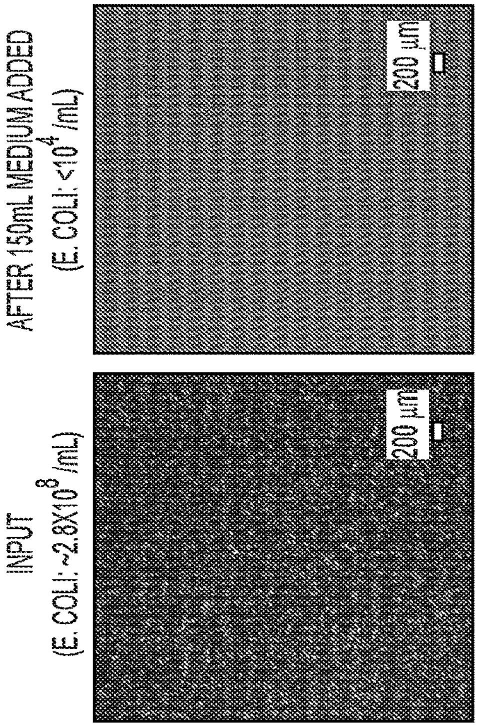
FIG. 6C are fluorescent microscopic images of the initial input and the final sample for comparison of 1 μm beads concentration.

As shown in FIG. 6A, approximately 72% of CHO cells remained in the final sample compared to the initial input while the concentration of *E. coli* was reduced by 4.3 LRV (approximately 20,000-fold) after 150 mL of medium was added to wash the initial sample. It was confirmed that approximately 1.0×$10^6$ cells/mL CHO cells were retained in the final sample (initial input: approximately 1.3×$10^6$ cells/mL) after 150 mL of medium washing (FIG. 6B). There were approximately $10^4$ CFU/mL *E. coli* left in the final sample by fluorescent microscopy and approximately 1.4×$10^4$ CFU/mL by CFU plating on Luria-Bertani (LB) agar plate (initial input: approximately 2.8×$10^8$ CFU/mL) (FIG. 6C). Thus, clearance of adventitious agents using spiral microfluidics was demonstrated for an actual adventitious agent (*E. coli*, a bacteria).

Modifications and variations of the devices and methods of making and using will obvious to those skilled in the art from the foregoing detailed description and are intended to come within the scope of the following claims.

We claim:

1. A process for separating larger particles from smaller particles comprising:

(i) flowing a fluid comprising the larger particles and the smaller particles into a device comprising:

a spiral microfluidic channel on a support, the spiral microfluidic channel having an inlet in a center of the spiral microfluidic channel and an outlet at the outer end of the spiral microfluidic channel, the outlet at the outer end of the spiral microfluidic channel being bifurcated to yield a first outlet for fluid from an inner wall of the spiral microfluidic channel and a second outlet for fluid from an outer wall of the spiral microfluidic channel;

wherein the device further comprises a first reservoir for the fluid, the first reservoir being fluidly connected to the inlet of the spiral microfluidic device;

wherein the fluid flows into the inlet in the center of the spiral microfluidic channel; and (ii) continuously adding a volume of a wash fluid medium into the first reservoir during the flowing of step (i) sufficient to maintain the population density of the larger particles in the fluid and provide for a log reduction value (LRV) of the smaller particles from the fluid by at least a value of 4 following steps (i) and (ii), as compared to the fluid prior to step (i).

2. The process of claim 1 wherein the larger particles comprise cells that are optionally mammalian cells.

3. The process of claim 2 wherein the cells are mammalian cells that are from a cultured cell line.

4. The process of claim 1 where the smaller particles are selected from the group consisting of viruses, bacteria, fungal cells, and nucleic acid particles.

5. The process of claim 1 wherein the fluid is pumped through the spiral microfluidic device at a rate of up to 5 ml/min.

6. The process of claim 1, the device further comprising a pump to circulate the fluid through the spiral microfluidic device.

7. The process of claim 1, the device further comprising a second reservoir for collection of effluent from the outer wall of the spiral microfluidic channel.

8. The process of claim 1, wherein the device is in tandem with one or more additional spiral microfluidic devices.

* * * * *